(12) United States Patent
Geraghty et al.

(10) Patent No.: US 11,178,633 B2
(45) Date of Patent: Nov. 16, 2021

(54) ASSET LOCATION TRACKING IN OPEN SPACE ENVIRONMENTS

(71) Applicant: AT&T Intellectual Property I, L.P., Atlanta, GA (US)

(72) Inventors: Timothy Geraghty, Woodbridge, NJ (US); Caroleen Chen, Jersey City, NJ (US); Ralph Quinto, Hazlet, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

(21) Appl. No.: 16/671,766

(22) Filed: Nov. 1, 2019

(65) Prior Publication Data

US 2021/0136720 A1    May 6, 2021

(51) Int. Cl.
| | |
|---|---|
| *G08B 3/10* | (2006.01) |
| *H04W 4/02* | (2018.01) |
| *H04W 64/00* | (2009.01) |
| *H04W 4/029* | (2018.01) |
| *G01S 5/02* | (2010.01) |
| *H04W 4/80* | (2018.01) |
| *H04W 88/08* | (2009.01) |
| *H04W 4/021* | (2018.01) |

(52) U.S. Cl.
CPC ............ *H04W 64/00* (2013.01); *G01S 5/02* (2013.01); *H04W 4/021* (2013.01); *H04W 4/023* (2013.01); *H04W 4/029* (2018.02); *H04W 4/80* (2018.02); *H04W 88/08* (2013.01)

(58) Field of Classification Search
None
See application file for complete search history.

(56) References Cited

U.S. PATENT DOCUMENTS

| | | | |
|---|---|---|---|
| 2019/0068776 A1* | 2/2019 | Dyne | H04M 1/72463 |
| 2019/0221083 A1* | 7/2019 | Grant | G08B 3/1016 |

* cited by examiner

*Primary Examiner* — Gary Lafontant

(57) ABSTRACT

In one example, a processing system including at least one processor may receive a first set of location reports for a device in an environment including a plurality of wireless beacons, determine, based on the first set of location reports for the device, a first location of the device in the environment, initiate, based on the first location of the device in the environment, a sending of a content item toward the device, receive a second set of location reports for the device, determine, based on the second set of location reports for the device, a second location of the device in the environment, and provide, based on the first location of the device in the environment and the second location of the device in the environment, a metric indicative of an effectiveness of the content item in causing movement of a user of the device in the environment.

20 Claims, 4 Drawing Sheets

ASSET LOCATION TRACKING IN OPEN SPACE ENVIRONMENTS

The present disclosure relates generally to location tracking, and more particularly to methods, non-transitory computer-readable media, and apparatuses for asset location tracking in open space environments.

SUMMARY

Methods, computer-readable media, and apparatuses for supporting asset location tracking in environments, such as open space environments, are described. For instance, in one example, a processing system including at least one processor may receive a first set of location reports for a device in an environment including a plurality of wireless beacons, determine, based on the first set of location reports for the device, a first location of the device in the environment, initiate, based on the first location of the device in the environment, a sending of a content item toward the device, receive a second set of location reports for the device, determine, based on the second set of location reports for the device, a second location of the device in the environment, and provide, based on the first location of the device in the environment and the second location of the device in the environment, a metric indicative of an effectiveness of the content item in causing movement of a user of the device in the environment.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure describes methods, computer-readable media, and apparatuses for supporting asset location tracking in open space environments. In one example, the present disclosure may include receiving a plurality of sets of location reports for a respective plurality of devices in an open space environment including a plurality of wireless beacons, determining, based on the plurality of sets of location reports for the respective plurality of devices, a respective plurality of locations of the respective plurality of devices in the open space environment, and performing, based on at least one of the plurality of locations of at least one of the plurality of devices in the open space environment, one or more management actions. The one or more management actions may include one or more environment-related management actions (e.g., generating one or more representations of location usage in the open space environment, performing location usage trend analytics for the open space environment, and the like), one or more asset-related management actions (e.g., pushing one or more content items to one or more of the devices in the open space environment, tracking movements of one or more of the assets in the open space environment, attempting to influence movements of one or more of the assets in the open space environment, analyzing the results of attempts to influence movements of one or more of the assets in the open space environment, and the like), and so forth. These and other examples of the present disclosure may be useful for performing location tracking of various types of assets (e.g., users, devices, and so forth) within various types of open space environments, such as open floor plan indoor environments (e.g., in a home, an office, a store, a restaurant, a library, a museum, and the like), outdoor environments (e.g., in a park, a college or enterprise campus, and the like), open space environments which may have indoor and outdoor sections (e.g., in a sport stadium, a museum, and the like), and so forth. Accordingly, it will be appreciated that, although primarily presented herein with respect to supporting asset location tracking for particular types of assets in particular types of open space environments, various embodiments of the present disclosure may be used to support asset location tracking for various other types of assets, in various other types of open space environments, and so forth. These and other aspects of the present disclosure are described in greater detail below in connection with the examples of FIGS. 1-4.

Figure 1:
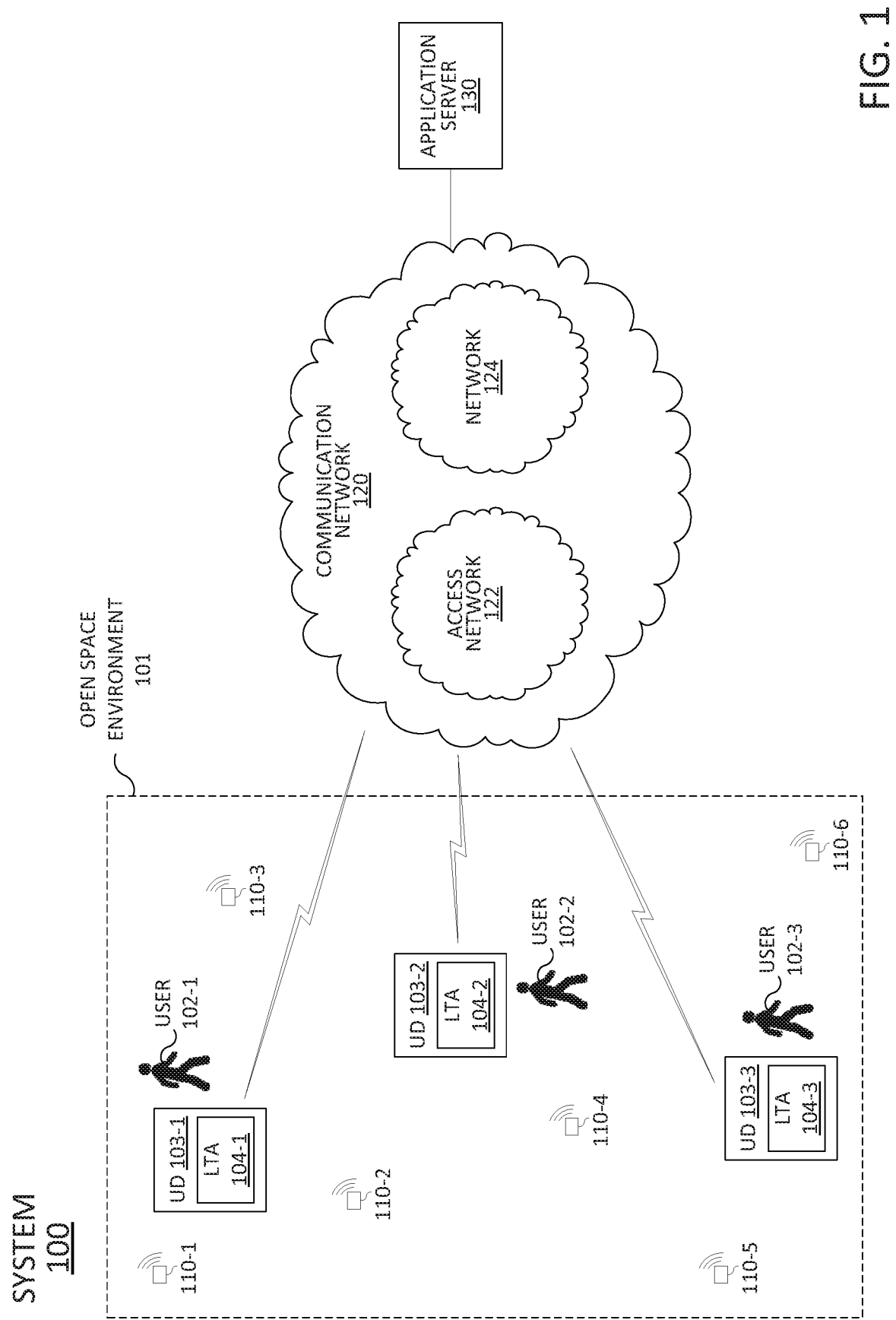
FIG. 1 illustrates an example system for supporting asset location tracking in an open space environment, in accordance with the present disclosure.

FIG. 1 illustrates an example system for supporting asset location tracking in an open space environment, in accordance with the present disclosure.

The system 100 may support asset location tracking in various types of open space environments, which are represented in FIG. 1 by an open space environment 101. The open space environment 101 is a physical environment within which assets (e.g., users, devices, and so forth) may move or be moved for various purposes. The open space environment 101 may be characterized by space that is flexible or that lacks fixed definition. In one example, the open space environment 101 is an open floor plan indoor environment (e.g., in a home, an office, a store, a restaurant, a library, a museum, and so forth). In one example, the open space environment 101 is an outdoor environment (e.g., in a park, a college or enterprise campus, and so forth). In one example, the open space environment 101 may include both indoor and outdoor sections (e.g., in a college or enterprise campus including buildings that have respective open floor plan indoor locations (e.g., tables, cubicles, and so forth) and outdoor locations between and around the buildings, a sports stadium including stores that are located inside of the building and seats that are located outside in an open air environment, and so forth). It will be appreciated that the open space environment 101 may be defined in various other ways.

The system 100 may support asset location tracking for tracking various types of assets. For example, the system may support asset location tracking for tracking users, devices (e.g., computers, Internet-of-Things (IoT) devices, and the like), and so forth. For example, asset location tracking may be provided for tracking locations of users within the open space environment 101 (e.g., for supporting various environment-related management actions, for supporting various asset-related management actions, and so forth). For example, asset location tracking may be provided for tracking locations of IoT devices within the open space environment 101 (e.g., for providing an IoT device management capability for managing use of IoT devices within the open space environment 101). It will be appreciated that asset location tracking may be provided for tracking locations of various other types of assets within the open space environment 101 and, thus, for supporting various other asset location tracking use cases. In the example of FIG. 1, location tracking is provided for a set of users (illustratively, users 102-1 to 102-3 which may be referred to collectively as users 102) carrying a set of user devices (illustratively, user devices 103-1 to 103-3 which may be referred to collectively as user devices 103), respectively. It will be appreciated that, although primarily presented herein with respect to examples for supporting user location tracking based on device location tracking (e.g., tracking the user devices 103 carried by the users 102), various examples of the present disclosure may be used to support asset location tracking for various other types of assets which may be located within open space environments (e.g., other types of devices and so forth).

The system 100 may include various elements which may cooperate to support asset location tracking for various types of assets located within the open space environment 101 (e.g., for tracking the locations of the users 102 within the open space environment 101 based on tracking of the locations of the user devices 103 within the open space environment 101). For example, the system 100 includes a set of wireless beacons 110-1 to 110-6 (collectively, wireless beacons 110), located within the open space environment 101, which may support asset location tracking in the open space environment 101. For example, the system 100 may include a communication network 120 which may support asset location tracking for tracking assets in the open space environment 101. For instance, the system 100 may include an application server (AS) 130 which may support asset location tracking for tracking assets in the open space environment 101. It will be appreciated that the system 100 may include various other elements which may support asset location tracking for tracking assets within the open space environment 101.

In one example, the user devices 103 may include any types of user devices which may be used by the users 102 within the open space environment 101 and which may be configured to support asset location tracking in the open space environment 101. For example, user devices 103 may each comprise a mobile device, a cellular smart phone, a wearable computing device (e.g., smart glasses), a laptop, a tablet computer, or the like. In one example, the user devices 103 may include location tracking applications (LTAs) 104 (illustratively, location tracking applications 104-1 to 104-3 on user devices 103-1 to 103-3, respectively) configured to provide one or more operations or functions for supporting asset location tracking (e.g., sending location reports to AS 130, presenting content pushed by AS 130, and so forth). In one example, the LTAs 104 may include Bluetooth-enabled applications or applications based on other types of local wireless communication technologies (e.g., Zigbee or the like). In one example, a user device 103 includes a computing device or processing system, such as computing system 400 depicted in FIG. 4, and may be configured to provide one or more operations or functions for supporting asset location tracking within an open space environment in accordance with the present disclosure.

In one example, the wireless beacons 110 may include any types of wireless beacons which may be configured to support asset location tracking in an open space environment. The wireless beacons 110 may be deployed within the open space environment 101 in various ways, such as on or within ceilings, on or within walls, on or within fixtures, and so forth, where it will be appreciated that the manner in which the wireless beacons 110 are deployed within the open space environment 101 may vary based on various characteristics of the open space environment 101. The wireless beacons 110 may be configured to broadcast, within the open space environment 101, wireless signals which may be detected by the user devices 103 and used by the user devices 103 to generate and send location reports to the AS 130. For example, the wireless beacons 110 may include PiBeacon devices or other suitable types of wireless devices (e.g., Institute of Electrical and Electronics Engineers (IEEE) 802.15 based-beacons, IEEE 802.11 wireless routers and/or access points (AP), cellular base stations, and so forth) configured to broadcast, within the open space environment 101, wireless signals which may be detected by the user devices 103 and used by the user devices 103 to generate and send location reports to the AS 130.

In one example, the communication network 120 may include any one or more types of communication networks which may support asset location tracking in an open space environment, such as a traditional circuit switched network (e.g., a public switched telephone network (PSTN)) or a packet network such as an Internet Protocol (IP) network (e.g., an IP Multimedia Subsystem (IMS) network), an asynchronous transfer mode (ATM) network, a wireless network, a cellular network (e.g., 2G, 3G, and the like), a long term evolution (LTE) network, a 5G network, and the like, related to the current disclosure. It should be noted that an IP network is broadly defined as a network that uses Internet Protocol (IP) to exchange data packets. Additional examples of IP networks include Voice over IP (VoIP) networks, Service over IP (SoIP) networks, and the like. The communication network 120 may support communications between devices in the open space environment 101 (e.g., user devices 103, wireless beacons 110, other devices which may be located at open space environment 101 (e.g., IoT devices), and so forth) and the AS 130 for purposes of supporting asset location tracking in accordance with the present disclosure. The communication network 120 may include an access network 122 and a network 124.

In one example, the access network 122 may include a broadband cable access network, a broadband optical access network, a Local Area Network (LAN), a wireless access network (e.g., an IEEE 802.11/Wi-Fi network and the like), a cellular access network (e.g., 2G, 3G, 4G, LTE, 5G, and so forth), a Digital Subscriber Line (DSL) network, a public switched telephone network (PSTN) access network, a third-party network, and the like.

In one example, the network 124 may include a telecommunication service provider network, a core network, an enterprise network including infrastructure for computing and providing communications services of a business, an educational institution, a governmental service, or other enterprises. In one example, the network 124 may combine core network components of a cellular network with components of a triple play service network; where triple-play services include telephone services, Internet or data services, and television services to subscribers. For example, the network 124 may functionally include a fixed mobile convergence (FMC) network, e.g., an IP Multimedia Subsystem (IMS) network. In addition, the network 124 may functionally include a telephony network, e.g., an Internet Protocol/Multi-Protocol Label Switching (IP/MPLS) backbone network utilizing Session Initiation Protocol (SIP) for circuit-switched and Voice over internet Protocol (VoIP) telephony services. In one example, the network 124 may further include a broadcast television network, e.g., a traditional cable provider network or an Internet Protocol Television (IPTV) network, as well as an Internet Service Provider (ISP) network. In one example, the network 124 may include a plurality of television (TV) servers (e.g., a broadcast server, a cable head-end), a plurality of content servers, an advertising server (AS), an interactive TV/video on demand (VoD) server, and so forth.

In one example, the communication network 120 may be operated by a telecommunication network service provider. The operator of the communication network 120 may provide various services to subscribers via the communication network 120. For example, the operator of the communication network 120 may provide a cable television service, an IPTV service, or any other types of telecommunication services to subscribers via the access network 122 and the network 124. It will be appreciated that, although primarily described with respect to examples in which the communication network 120 is operated by a single service provider, the network 124 and the access network 122 may be operated by different service providers, either or both of the network 124 and the access network 122 may be operated by entities having core businesses that are not related to telecommunications services (e.g., corporate, governmental, or educational institution LANs, and the like), and so forth.

In one example, AS 130 may support asset location tracking for tracking assets in the open space environment 101. In one example, the AS 130 may process sets of location reports received from the user devices 103 in the open space environment 101 for determining locations of the user devices 103 (and, thus, the associated users 102) within the open space environment 101. AS 130 may then use the locations of the user devices 103 (and, thus, the associated users 102) within the open space environment 101 for performing asset location tracking in the open space environment 101. In one example, the AS 130 may support asset location tracking in the open space environment 101 in order to perform one or more management actions, such as one or more environment-related management actions (e.g., generating one or more representations of location usage in the open space environment 101, performing location usage trend analytics for the open space environment 101, and the like), one or more asset-related management actions (e.g., pushing one or more content items to one or more of the user devices 103 in the open space environment 101, tracking movements of one or more of the users 102 in the open space environment 101, attempting to influence movements of one or more of the users 102 in the open space environment 101, analyzing the results of attempts to influence movements of one or more of the users 102 in the open space environment 101, and the like), and so forth. In one example, the AS 130 may support asset location tracking for tracking assets in the open space environment 101 by receiving a first set of location reports for a user device 103, determining, based on the first set of location reports for the user device 103, a first location of the user device 103 in the open space environment 101, initiating, based on the first location of the user device 103 in the open space environment 101, a sending of a content item toward the user device 103, receiving a second set of location reports for the user device 103, determining, based on the second set of location reports for the user device 103, a second location of the user device 103 in the open space environment 101, and providing, based on the first location of the user device 103 in the open space environment 101 and the second location of the user device 103 in the open space environment 101, a metric indicative of an effectiveness of the content item in causing movement of the user 102 of the user device 103 in the open space environment 101. It will be appreciated that the AS 130 may support various other functions for supporting asset location tracking in the open space environment 101. In one example, AS 130 includes a computing device or processing system, such as computing system 400 depicted in FIG. 4, and may be configured to provide one or more operations or functions for supporting asset location tracking within an open space environment in accordance with the present disclosure.

In accordance with the present disclosure, the wireless beacons 110 may broadcast wireless signals which may be detected by user devices 103. Accordingly, the user devices 103 may detect the wireless signals from the wireless beacons 110, generate respective sets of location reports based on the wireless signals from the wireless beacons 110, and send the respective sets of location reports to the AS 130 via the communication network 120. AS 130 may therefore receive the respective sets of location reports of the user devices 103 via the communication network 120, process the respective sets of location reports of the user devices 103 to determine the locations of the user devices 103 (and, thus, the associated users 102) within the open space environment 101, and use of the locations of the user devices 103 (and, thus, the associated users 102) for various purposes (e.g., initiating one or more environment-related management actions, initiating one or more asset-related management actions, and so forth).

In one example, the wireless signals broadcast by the wireless beacons 110 may include information suitable for use in determining locations of the user devices 103 within the open space environment 101. For example, a wireless signal that is broadcast by a wireless beacon 110 and detected by a user device 103 may include an identifier of the wireless beacon 110 which, in combination with a determination by the user device 103 of a signal strength of the wireless signal that is broadcast by a wireless beacon 110, may be used (e.g., by the user device 103, the AS 130, and so forth, depending on where the processing is performed) to determine a distance between the wireless beacon 110 and the user device 103 that has received the wireless signal. In an example in which a wireless beacon 110 is a PiBeacon, the wireless signal that is broadcast by the wireless beacon 110 may include the following information: <UUID, Major, Minor>, where UUID is a unique identifier of the wireless beacon 110. It will be appreciated that the wireless signals broadcast by the wireless beacons 110 may include various other types of information suitable for use in determining the locations of the user devices 103 within the open space environment 101.

In one example, the set of location reports generated by a user device 103 based on wireless signals broadcast by wireless beacons 110 may include a single location report that identifies the location of the user device 103 within the open space environment 101. For example, where the user device 103 is configured to support processing capabilities for triangulating its location within the open space environment 101, the user device 103 may receive multiple wireless signals broadcast from multiple wireless beacons 110 in the open space environment 101, process the multiple wireless signals based on various location triangulation techniques (e.g., observed time difference of arrival (OTDA), barycentric triangulation, or the like) to determine its location within open space environment 101, and send the determined location within open space environment 101 to the AS 130 in a location report. In an example based on FIG. 1, for example, the user device 103-1 may triangulate its location within the open space environment 101 based on wireless signals broadcast by wireless beacons 110-1, 110-2, and 110-3. It is noted that where the set of location reports of a user device 103 includes a single location report that identifies the location of the user device 103 within the open space environment 101, the location report may also include other types of information (e.g., timestamp information and so forth) which may be used by the AS 130 to determine the location of user device 103 within the open space environment 101 or which may be used by the AS 130 for other asset location tracking purposes.

In one example, the set of location reports generated by a user device 103 based on wireless signals broadcast by wireless beacons 110 may include a set of multiple location reports including location reporting information for the user device 103. In one example, the location reporting information included within a location report of a user device 103 may include wireless beacon identification information and distance-indicative information, which may be processed by the AS 130 to determine the location of the user device 103 within the open space environment 101. In one example, a location report of a user device 103 that includes wireless beacon identification information and distance indicative information may include an identifier of one of the wireless beacons 110 with which the location report is associated and distance-indicative information indicative of a distance between the user device 103 and the one of the wireless beacons 110 with which the location report is associated. The information indicative of the distance between the user device 103 and the one of the wireless beacons 110 with which the location report is associated may include a distance value (e.g., where the user device 103 determines the distance value and includes the distance value within the location report), signal strength information indicative of the signal strength of the wireless signal broadcast by the wireless beacon 110 with which the location report is associated (e.g., where the AS 130 may process the signal strength information to determine the distance between the user device 103 and the one of the wireless beacons 110 with which the location report is associated), and so forth. It is noted that the location reporting information included within a location report of a user device 103 may include less or more, as well as different, types of information (e.g., timestamp information and so forth) which may be used by the AS 130 to determine the location of user device 103 within the open space environment 101 or which may be used by the AS 130 for other asset location tracking purposes. It is noted that, where the set of location reports of a user device 103 includes a set of multiple location reports including distance-indicative information which may be processed by the AS 130 to determine the location of the user device 103 within the open space environment 101, the location reports also or alternatively may be referred to as distance reports or a set of distance reports.

In one example, the AS 130 receives the sets of location reports of the user devices 103 and determines the locations of the user devices 103 within the open space environment 101 based on the sets of location reports of the user devices 103, respectively. As discussed herein, AS 130 may determine the locations of the user devices 103 within the open space environment 101 by reading the locations the user devices 103 from the respective location reports of the user devices 103 that are received by the AS 130 (e.g., in examples in which the user devices 103 determine their own locations and include their locations within the location reports), by determining the locations of the user devices 103 based on processing of the location reporting information (e.g., wireless beacon identification information and distance-indicative information) included within the respective location reports of the user devices 103 that are received by the AS 130, and so forth. It is noted that where the AS 130 determines the locations of the user devices 103 based on processing of the location reporting information included within the respective location reports in the sets of location reports of the user devices 103 that are received by the AS 130, the AS 130 may utilize various location determination processing techniques (e.g., triangulation techniques such as OTDA, barycentric triangulation, or the like, or other location determination processing techniques) for processing the location reporting information in the sets of location reports of the user devices 103 to determine the locations of the user devices 103 within the open space environment 101.

In various examples for determining the locations of the user device 103 within the open space environment 101, the locations of the user devices 103 within the open space environment 101 may be determined and specified in various ways. In one example, the locations of the user devices 103 within the open space environment 101 may be determined based on knowledge of locations of the wireless beacons 110 within the open space environment 101. The locations of the wireless beacons 110 within the open space environment 101 may be specified as absolute locations (e.g., based on GPS coordinates specifying latitude, longitude, and in one example also including altitude) and/or relative locations (e.g., relative to one or more reference points associated with the open space environment 101, such as a boundary of the open space environment 101, a grid layout defined for the open space environment 101, and so forth). Similarly, the locations of the user devices 103 within the open space environment 101 may be specified as absolute locations and/or relative locations.

In various examples, the open space environment 101 may be considered to be organized in various ways (e.g., which may depend on the environment type of the open space environment 101) which may be defined at various levels of granularity (e.g., which may depend on the environment type of the open space environment 101), thereby allowing asset location tracking to be performed at various levels of granularity in various types of open space environments.

In one example, the AS 130 uses one or more locations of one or more of the user devices 103 within the open space environment 101 for one or more purposes. For example, the AS 130 may use one or more locations of one or more of the user devices 103 within the open space environment 101 for performing one or more management actions. For example, the AS 130 may use one or more locations of one or more of the user devices 103 within the open space environment 101 for one or more of providing one or more environment-related management actions (e.g., generating one or more representations of location usage in the open space environment 101, performing location usage trend analytics for the open space environment 101, and the like), providing one or more asset-related management actions (e.g., pushing one or more content items to one or more of the user devices 103 in the open space environment 101, tracking movements of one or more of the users 102 in the open space environment 101, attempting to influence movements of one or more of the users 102 in the open space environment 101, analyzing the results of attempts to influence movements of one or more of the users 102 in the open space environment 101, and the like), and so forth.

In one example, the AS 130 provides a management action that includes generating a representation of location usage in the open space environment 101 based on the locations of the user devices 103 in the open space environment 101. The representation of location usage in the open space environment 101 may be indicative of usage of the open space environment 101 by the users 102 of the user devices 103. The representation of location usage in the open space environment 101 may be provided in the form of a location usage map configured to indicate numbers of users 102 at respective points within the open space environment 101. The location usage map may be based on the layout of the open space environment 101 (e.g., using a floorplan where the open space environment 101 is an indoor location, using a terrain or physical map where the open space environment 101 is an outdoor location, and so forth). The location usage map may indicate numbers of users 102 at respective points within the open space environment 101 using various types of indicators (e.g., using icons such that clustering of icons or lack of clustering of icons at points within the open space environment 101 are indicative of the level of usage in the respective points within the open space environment 101, using shading such that relatively light or dark shading at points within the open space environment 101 are indicative of the level of usage in the respective points within the open space environment 101, using colors such that use of different colors at points within the open space environment 101 are indicative of the level of usage in the respective points within the open space environment 101, or using other visual indicators suitable for indicating numbers of users 102 at respective points within the open space environment 101) or using other suitable representations of location usage in the open space environment 101.

In one example, the location usage map may be a location usage heat map in which various colors are used to indicate numbers of users 102 at respective points within the open space environment 101, where different colors may be representative of different levels of usage in the respective points within the open space environment 101. It will be appreciated that such a representation of location usage in the open space environment 101 may be useful for various purposes, such as modifying one or more aspects of the open space environment 101, generating recommendations regarding modifications to various aspects of the open space environment, designing a new open space environment which may have various characteristics similar to the open space environment 101, determining whether to attempt to cause movements of users 102 within the open space environment 101 (e.g., from relatively crowded locations of the open space environment 101 to relatively uncrowded locations of the open space environment 101), and so forth. It will be appreciated that the representation of location usage in the open space environment 101 may be used in various other ways. Accordingly, the AS 130 may store the representation of location usage in the open space environment 101, process the representation of location usage in the open space environment 101, provide the representation of location usage in the open space environment 101 to one or more other devices for various purposes, and so forth. It will be appreciated that the representation of location usage in the open space environment 101 may alternatively or additionally be provided using various other types of representations suitable for indicating location usage in the open space environment 101.

In one example, the AS 130 provides a management action that includes augmenting a representation of location usage in the open space environment 101. The AS 130 may augment the representation of location usage in the open space environment 101 to include user action information indicative of actions of users 102 in the open space environment 101. The AS 130 may augment the representation of location usage in the open space environment 101 to include user action information for various types of user actions (e.g., movements of users 102 in the open space environment 101, purchases made by users 102 in the open space environment 101, use of resources of the open space environment 101 by the users 102, and so forth). The AS 130 may augment the representation of location usage in the open space environment 101 to include user action information using various mechanisms for representing the user action information (e.g., overlays, icons, color, shading, and so forth). The AS 130 may augment the representation of location usage in the open space environment 101 to include user action information associated with actions of users 102 in the open space environment 101 in various other ways.

In one example, the AS 130 provides a management action that includes performing location usage trend analytics for the open space environment 101 and generating location usage analytics results for the open space environment 101. The performing of location usage trend analytics and generating of location usage analytics results for the open space environment 101 may be based on analysis of the location information of the user devices 103, based on analysis of representations of location usage in the open space environment 101, and so forth. The location usage analytics results for the open space environment 101 may include identification of location usage trends (e.g., points or areas of open space environment 101 that are over-utilized or underutilized at various points in time or across various time scales, changes in location usage of open space environment 101 over various time scales, and so forth). The location usage analytics results for the open space environment 101 may include trends related to particular times or ranges of time (e.g., location usage trends for particular hours of the day, days of the week, weeks of the year, and so forth), trends over time (e.g., changes in location usage over days, weeks, months, years, and so forth). The location usage analytics results for the open space environment 101 may be used for various purposes, such as initiating one or more management actions for the open space environment 101 (e.g., modifications to various aspects of the open space environment 101, generating recommendations regarding modifications to various aspects of the open space environment 101, determining whether to attempt to cause movements of users 102 within the open space environment 101 (e.g., at particular times of day, on particular days of the week, and so forth), and the like), initiating one or more management actions for one or more new open space environments (e.g., providing recommendations for designing various aspects of the new open space environments, and the like), and so forth.

In one example, the AS 130 performs a management action that includes pushing a content item to one or more user devices 103 of one or more users 102. The content item that is pushed may include a notification, an advertisement, an offer, informational content, and so forth. The content item that is pushed may be specific to a single user 102 (and, thus, only pushed to the user device 103 of that single user 102), may be related to a group of users 102 (and, thus, pushed to the user devices 103 of each of the users 102 in that group of users 102), and so forth. The content item that is pushed may be determined based on the locations of the user devices 103 of the users 102, based on the locations of the user devices 103 of the users 102 and additional information associated with the users 102 (e.g., account information of the users, interests of the users, and the like), and so forth. The content item that is pushed may be determined based on application of machine learning techniques (e.g., for analysis of the above-referenced additional information associated with the users 102) in order to determine the content item that is pushed. It will be appreciated that various other types of content items may be pushed to the user devices 103 of the users 102, the content items to be pushed to the user devices 103 of the users 102 may be determined in various other ways, and so forth. It will be appreciated that the pushing of a content item to one or more user devices 103 of one or more users 102 also may be considered to be, and, thus, referred to herein, as sending a communication to one or more user devices 103 of one or more users 102, where it will be understood that the communication may be considered to be the content item or may be considered to include the content item. It will be appreciated that the pushing of a content item to one or more user devices 103 of one or more users 102 may be further understood by way of reference to the following examples.

In one example, the AS 130 may use one of the locations of one of the user devices 103 to send user-specific content item(s) to the user 102 of the one of the user devices 103. For example, the AS 130 may use a location of a user device 103 as a basis for determining the user-specific content item to be sent to the user device 103 for viewing by the user 102 of the user device 103. For example, where the open space environment 101 is a shopping mall, the user-specific content item may be an advertisement or offer for a store or restaurant in the shopping mall that the user 102 is determined to be near. In an example where the open space environment 101 is an office, the user-specific content item may be a message identifying the location of a nearby workspace that is available, a message identifying the location of nearby printers, and so forth. Similarly, in an example where the open space environment 101 is a museum, the user-specific content item might be a multimedia clip providing additional information about an exhibit of the museum that the user 102 is determined to be near, an indication of an exhibit that is not crowded or an exhibit in which the user 102 may have a personal interest, and so forth. It will be appreciated that various other types of user-specific content items may be pushed to the user 102 in various other contexts. It will be appreciated that, although primarily discussed with respect to examples in which user-specific content item(s) is/are provided for a single user 102, various content items may be provided for groups of users 102 (e.g., pushing advertisements to the user devices 103 of each of the users 102 within a vicinity of a target area within the open space environment 101, pushing environment information for the open space environment 101 to each of the user devices 103 of each of the users 102 located within the open space environment 101, and so forth).

In one example, the AS 130 may use one of the locations of one of the user devices 103, in conjunction with additional information related to the user 102 of the user device 103, to send user-specific content item(s) to the user 102 of the one of the user devices 103. For example, the user 102 may be a customer of a wireless service provider who has a family plan with the wireless service provider. The AS 130, based on a determination that the user 102 has entered a retail location of the wireless service provider and is currently standing in front of a phone display that is associated with a promotion currently being run by the wireless service provider, may query a customer records database of the wireless service provider and determine that that the user 102 currently has x number of devices to upgrade, query a customer history database for the user 102 (e.g., feedback regarding service of the user 102 and so forth), and use the retrieved information to create a personalized advertisement for the user 102 to try to obtain a sale with the user 102.

It will be appreciated that the pushing of content item(s) to one or more user devices 103 of one or more users 102 may be initiated for various purposes. For example, the pushing of content to one or more user devices 103 of one or more users 102 may be initiated for enhancing the experience of users 102 in the open space environment, such as providing a notification to one or more users 102 regarding availability of less crowded space in one or more other locations of the open space environment 101 (e.g., a less crowded work area in an office building, a less crowded exhibit of a museum, and so forth), providing an advertisement to one or more users 102 to enable the users 102 to avail themselves of a deal offered by a store located in the open space environment 101, providing an offer to one or more users 102 to enable the users 102 to avail themselves of a deal offered by a store located in the open space environment 101, providing information to one or more users 102 (e.g., information about the open space environment 101, additional information regarding an exhibit in a museum, etc.), and so forth. For example, the pushing of content item(s) to one or more user devices 103 of one or more users 102 may be initiated for attempting to cause movement of users 102 in the open space environment 101. It will be appreciated that the pushing of content item(s) to one or more user devices 103 of one or more users 102 may be initiated for various other purposes.

In one example, the AS 130 provides a management action that includes attempting to cause movement of one or more of the users 102 of the one or more user devices 103 in the open space environment 101. For example, the management action may be configured to attempt to cause movement of the one or more users 102 of the one or more user devices 103 toward a target area of the open space environment 101 (e.g., toward a location within a store to try to entice the user 102 to make a particular purchase, toward a store to try to entice the user 102 to enter the store to buy a product or register for a service, toward an area of an office where there is an available workspace which may be used by the user 102, toward an area of a park where a concert is about to begin, and so forth). For example, the management action may be configured to attempt to cause movement of the one or more users 102 of the one or more user devices 103 away from a target area in the open space environment 101 (e.g., away from an area of the open space environment 101 determined to be over-utilized, away from an area of the open space environment 101 where there is an emergency situation, and so forth). In one example, the AS 130 provides a management action that is configured to attempt to cause movement of one or more of the users 102 of the one or more user devices 103 in the open space environment 101 by sending a content item to the one more user devices 103 of the one or more users 102. It will be appreciated that the AS 130 may initiate other actions to attempt to cause movement of one or more of the users 102 of the one or more user devices 103 in the open space environment 101.

In one example, the AS 130 provides a management action that includes determining the effectiveness of an attempt to cause movement of one or more users 102 of one or more user devices 103 in the open space environment 101. In one example, the AS 130 provides a management action that includes sending content item(s) to one or more of the user devices 103 based on the locations of the one or more user devices 103, determining updated locations of the one or more user devices 103 to which the content item(s) is/are sent, and providing a metric indicative of an effectiveness of the content item(s) in causing movement of the one or more users 102 of the one or more user devices 103 in the open space environment 101. For instance, the metric may be indicative of an effectiveness of the content item in causing movement of the one or more users 102 of the one or more user devices 103 toward a target area in the open space environment 101 (e.g., toward a location within a store, toward a store, toward an area of an office where there is an available workspace, toward an area of a park where a concert is starting, and so forth). In another example, the metric may be indicative of an effectiveness of the content item in causing movement of the one or more users 102 of the one or more user devices 103 away from a target area in the open space environment 101 (e.g., away from an area of the open space environment 101 determined to be over-utilized, away from an area of the open space environment 101 where there is an emergency situation, and so forth). The metric may be determined by evaluating various aspects of movement of users 102 (e.g., whether users 102 moved in a direction of the location to which the content item was configured to move them, whether the users 102 ultimately arrived in the location to which the content item was configured to move them, a quantity or percentage of users 102 that moved toward the location to which the content item was configured to move them (e.g., did at least a threshold number or percentage of users 102 move toward or to the location), and so forth. The metric may be stored for later use, presented to one or more users (e.g., in various forms, such as by presenting a value, using a graphical indicator, and so forth), processed for use in determining whether to modify the content item to try to improve the content item's effectiveness in causing movement of users 102 within the open space environment 101, provided to one or more devices for analysis (e.g., for use in determining whether to modify the content item to try to improve the content item's effectiveness in causing movement of users 102 within the open space environment 101), processed for use in determining a modification of the content item to improve the content item's effectiveness in causing movement of users 102 within the open space environment 101, and so forth.

It will be appreciated that, since a content item may be provided to one or more user devices 103 of one or more users 102 under various conditions, for various purposes, and so forth, the content item that is provided to one or more user devices 103 of one or more users 102 may be identified, or determined, by the AS 130 in various ways (e.g., responsive to various conditions, based on various types of input information, and so forth). The AS 130 may determine the content item in conjunction with initiating the sending of the content item to one or more user devices 103 of one or more users 102. The AS 130 may determine the content item to be provided to a user device 103 of a user 102 based on a location of the user device 103 of the user 102, based on a location of the user device 103 of the user 102 and an indication of a target area of the open space environment 101 (e.g., a target area toward which the user 102 is being directed (such as an underutilized area of the open space environment 101, a store offering a deal, and the like), a target area away from which the user 102 is being directed (such as an over-utilized area of the open space environment 101, an area of the open space environment 101 in which there is an emergency situation, and the like), and so forth), based on a location of the user device 103 of the user 102 and user information associated with the user 102 of the user device 103, and so forth. It will be appreciated that the content item to be provided to one or more user devices 103 of one or more users 102 may be determined under the control of the AS 130 in various other ways (e.g., in response to other conditions, based on other information or combinations of information, in conjunction with other processing steps, and so forth).

In one example, the AS 130 may be configured to support a white-box application and an associated administrative dashboard. For example, a base application of AS 130 may receive location reports, determine location information, and perform various management actions based on the location information. In one example, the AS 130 may be configured to collect additional information from one or more user devices 103 in the open space environment 101 (e.g., other phone data associated with the user devices 103). In one example, the AS 130 may be configured to plug into other databases (e.g., other databases of the service provider of the user devices 103 (e.g., customer care databases, purchase history databases, retail interaction databases, and the like), other databases of other entities (e.g., merchant databases, databases of other service providers, and the like), and so forth) for obtaining various other types of information which may be used in conjunction with the location information of the user devices 103 to support various functions. It will be appreciated that based on a combination of location information and connecting with other databases, personalized features of an application can be supported and used. It is noted that the white-box application may be configured to support various other functions discussed herein.

In one example, as indicated above, the AS 130 may be configured to support an administrative dashboard. In one example, the administrative dashboard may be configured to utilize other databases (e.g., an ad broker database or other databases). In one example, the administrative dashboard may be configured to enable an administrator to determine one or more zones to which a communication (e.g., a content item or other type of communication) is to be pushed, to customize the communication before it is pushed, and so forth. In one example, the administrative dashboard may be configured to enable an administrator to view static and dynamic location usage maps, such as heat maps, of equipped locations. In one example, the administrative dashboard may be configured to enable an administrator to click on an area within a location usage map, such as a location usage heat map, and select an associated radius in order to display a list of data points representing users 102 that are or have been within that location (e.g., users 102 currently in that location, users 102 within that location within a certain period of time, and so forth). It will be appreciated that this may enable the administrator to visualize a level of concentration or popularity for a particular area or location. In addition, these data points can be analyzed in graph form or chart form to analyze various trends over various time periods (e.g., hours, days, weeks, etc.). In one example, the administrative dashboard may be configured to enable an administrator to identify and analyze the actions that one or more of the users 102 take after receiving a communication, e.g., for use in determining outcomes, a level of success, and so forth. It is noted that the administrative dashboard may be configured to support various other functions discussed herein.

In one example, the AS 130 may be configured to support an indoor geospatial location and mapping service which may be of benefit to a variety of industries where physical space is used or to be developed. The AS 130 may be configured to support long-term analysis of open spaces for planning purposes, thereby enabling planners to receive tangible data for future planning models. The AS 130 may be configured to support various other functions for analysis and management of open spaces in various types of open space environments, such as in both workplaces, urban centers, and other environments that are trending toward or may trend toward an open model to allow freedom of creativity and communication to those who access and utilize the space. It will be appreciated that the AS 130 may be configured to support various other functions and to enable various management actions to be performed.

It will be appreciated that, although primarily presented with respect to examples in which management actions may be performed based on a single set of locations for a set of devices, various management actions may be performed based on multiple sets of locations for a set of devices. For example, locations of user devices 103 within the open space environment 101 may be tracked over time for various purposes, such as providing updated location usage representations (e.g., location usage heat maps), performing location usage trend analytics, analyzing effectiveness of causing movement of users 102 within the open space environment 101 under various conditions, and so forth. In addition, although only a single AS (namely, AS 130) is illustrated, any number of servers may be deployed and may operate in a distributed and/or coordinated manner as a processing system to perform operations for supporting asset location tracking within an open space environment in accordance with the present disclosure.

It should be noted that the system 100 has been simplified. Thus, it should be noted that the system 100 may be implemented in a different form than that which is illustrated in FIG. 1. For example, system 100 may be expanded by including additional endpoint devices, access networks, network elements, application servers, and so forth, without altering the scope of the present disclosure. For example, the system 100 may be altered to omit various elements, substitute elements for devices that perform the same or similar functions, combine elements that are illustrated as separate devices, and/or implement network elements as functions that are spread across several devices that operate collectively as the respective network elements, without altering the scope of the present disclosure. For example, the system 100 may include networks (not shown) in addition to communication network 120. For example, the system 100 may include access networks (not shown) in addition to access network 122. Similarly, the system 100 may include other networks (not shown) in addition to network 124. In addition, the system 100 may include other network elements (not shown) such as border elements, routers, switches, policy servers, security devices, gateways, a content distribution network (CDN), and the like. For example, the system 100 may further include wired or wireless connections to sensors, radio frequency identification (RFID) tags, or the like, from which devices may determine locations/positions, ranges/distances, bearings, and so forth within the open space environment 101. It will be appreciated that the system 100 may be modified in various other ways while still supporting asset location tracking in an open space environment. Thus, these and other modifications are all contemplated within the scope of the present disclosure.

Figure 2:
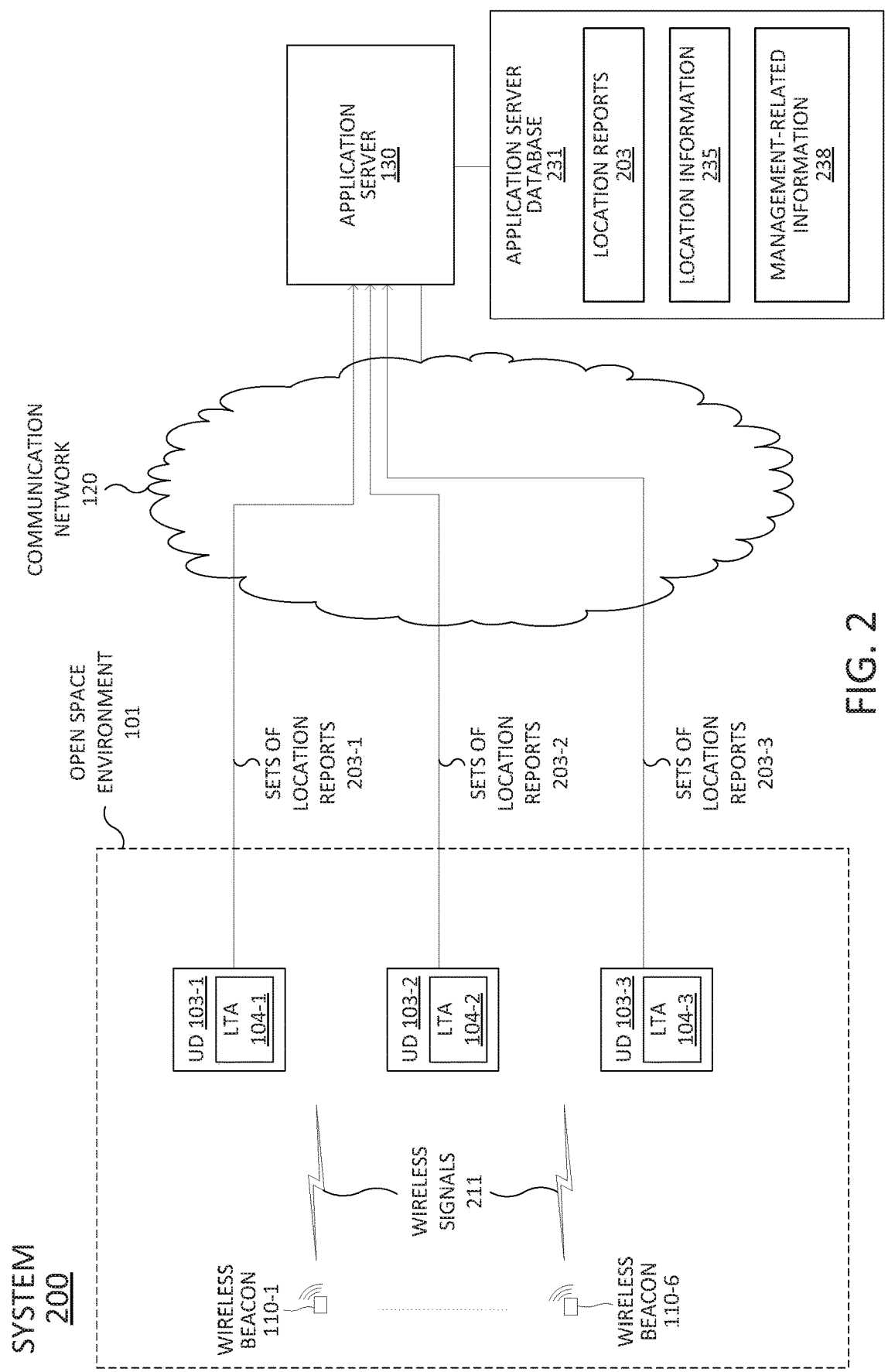
FIG. 2 illustrates an example system for supporting asset location tracking in an open space environment, in accordance with the present disclosure.

It is noted that various features discussed in conjunction with FIG. 1 may be further understood from the example system of FIG. 2.

FIG. 2 illustrates an example system for supporting asset location tracking in an open space environment, in accordance with the present disclosure. The system 200 of FIG. 2, similar to the system 100 of FIG. 1, includes the user devices 103 and the wireless beacons 110 in the open space environment 101, the communication network 120, and the AS 130. The system 200 also includes an AS database 231 (omitted from FIG. 1 for purposes of clarity) that is associated with the AS 130 and available for use by the AS 130 in storing information related to asset location tracking performed by the AS 130 for the open space environment 101. The system 200 of FIG. 2, as discussed further herein, may be configured to operate in a manner similar to the system 100 of FIG. 1 for supporting asset location tracking in an open space environment 101.

In the system 200 of FIG. 2, as discussed in conjunction with the system 100 of FIG. 1, the user devices 103-1-103-3 detect wireless signals 211 from the wireless beacons 110 at open space environment 101, generate sets of location reports 203-1-203-3, respectively, based on the wireless signals 211 from the wireless beacons 110, and send the sets of location reports 203-1-203-3 to the AS 130 via the communication network 120.

In the system 200 of FIG. 2, as discussed in conjunction with the system 100 of FIG. 1, the AS 130 receives the sets of location reports 203-1-203-3 from the user devices 103-1-103-3, respectively, via the communication network 120. The AS 130 stores the sets of location reports 203-1-203-3 from the user devices 103-1-103-3, respectively, in the AS database 231 as location reports 203.

In the system 200 of FIG. 2, as discussed in conjunction with the system 100 of FIG. 1, the AS 130 determines, based on processing of the respective sets of location reports 203-1-203-3 from the user devices 103-1-103-3, respective locations of the user devices 103-1-103-3 in the open space environment 101. As illustrated in FIG. 2, the AS 130 stores locations of the user devices 103-1-103-3 in the AS database 231 as location information 235.

In the system 200 of FIG. 2, as discussed in conjunction with the system 100 of FIG. 1, the AS 130 performs one or more management actions based on the locations of the user devices 103-1-103-3 in the open space environment 101. The AS database 231 maintains management-related information 238 associated with execution of such management actions by the AS 130. For example, the execution of such management actions by the AS 130 may result in access by the AS 130 to management-related information (e.g., management-related information 238 stored in the AS database 231, management-related information which may be available from one or more other systems or devices, and the like), generation by the AS 130 of management-related information (e.g., management-related information 238 which may be stored in the AS database 231, management-related information which may be stored in one or more other systems or devices, and the like), and so forth. It will be appreciated that the management-related information 238 may include location usage representations for open space environment 101, location usage trend analytics results for open space environment 101, environment-related recommendations for open space environment 101, content items available to be pushed to users 102 located in the open space environment 101, information related to tracking of user actions by users 102 located in the open space environment 101, information related to the effectiveness of causing movements of users 102 located in the open space environment 101, and so forth.

It is noted that, although depicted with respect to an example in which the management-related information 238 is stored in the AS database 231, the AS 130 also or alternatively may store the management-related information 238 in various other locations, may send the management-related information 238 to various systems or devices (e.g., one or more systems or devices configured to further analyze the management-related information 238 for various purposes (e.g., determining modifications to the open space environment 101, planning one or more new open space environments, evaluating the effectiveness of content items in causing movement of users 102 in the open space environment 101, modifying existing content items or generating new content items, and the like), one or more technician devices of one or more technicians who may use the management-related information 238 for various purposes (e.g., determining modifications to the open space environment 101, planning one or more new open space environments, evaluating the effectiveness of content items in causing movement of users 102 in the open space environment 101, modifying existing content items or generating new content items and the like)), and so forth.

It will be appreciated that the various information flows presented within the context of system 200 of FIG. 2 may be provided in various other ways. In addition, the system 200 of FIG. 2 may be configured to support various other functions discussed herein with respect to the system 100 of FIG. 1. It should also be noted that the system 200, like the system 100, has been simplified. Thus, it should be noted that the system 200 may be implemented in a different form than that which is illustrated in FIG. 2, without altering the scope of the present disclosure.

Figure 3:
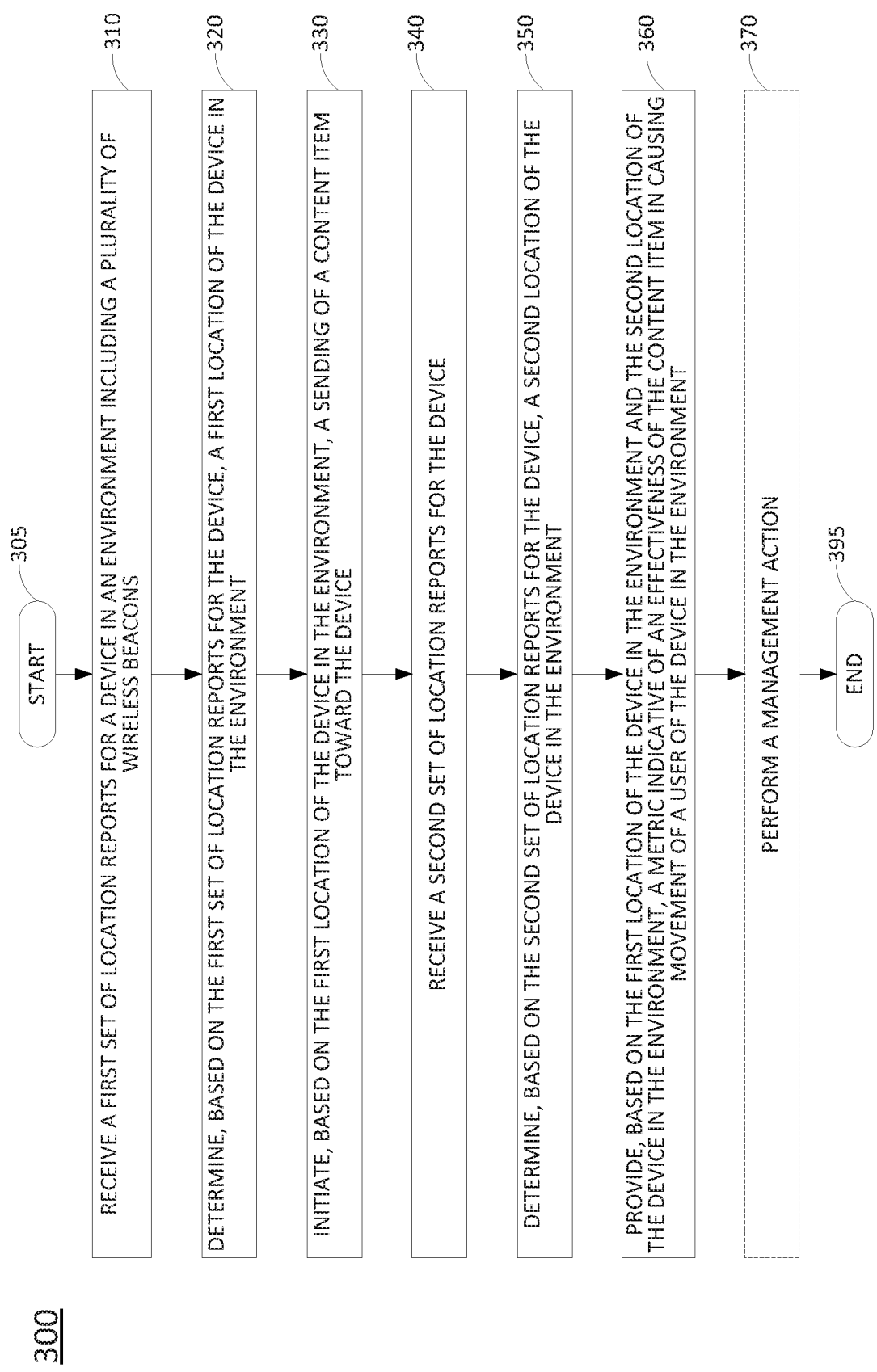
FIG. 3 illustrates a flowchart of an example method for supporting asset location tracking in an open space environment, in accordance with the present disclosure.

FIG. 3 illustrates a flowchart of an example method for supporting asset location tracking in an open space environment, in accordance with the present disclosure. In one example, the method 300 is performed by a component of the system 100 of FIG. 1 or the system 200 of FIG. 2, such as by AS 130, and/or any one or more components thereof (e.g., a processor, or processors, performing operations stored in and loaded from a memory), or by AS 130 in conjunction with one or more other devices, and so forth. In one example, the steps, functions, or operations of method 300 may be performed by a computing device or processing system, such as computing system 400 as described in connection with FIG. 4 below. For instance, the computing system 400 may represent any one or more components of the AS 130 in FIG. 1 or FIG. 2 that is/are configured to perform the steps, functions, and/or operations of the method 300. Similarly, in one example, the steps, functions, and/or operations of method 300 may be performed by a processing system including one or more computing devices collectively configured to perform various steps, functions, and/or operations of the method 300. For example, multiple instances of the computing system 400 may collectively function as a processing system. For illustrative purposes, the method 300 is described in greater detail below in connection with an example performed by a processing system. The method 300 begins in step 305 and proceeds to step 310.

At step 310, the processing system may receive a first set of location reports for a device in an environment including a plurality of wireless beacons. At step 320, the processing system may determine, based on the first set of location reports for the device, a first location of the device in the environment. In one example, the first set of location reports for the device includes a report including an indication of the first location of the device in the environment. In one example, the first set of location reports for the device includes a report including an identifier of one of the plurality of wireless beacons and distance information indicative of a distance between the device and the one of the plurality of wireless beacons. In one example, the first set of location reports for the device is received based on a Bluetooth-enabled application supported by the device.

At step 330, the processing system may initiate, based on the first location of the device in the environment, a sending of a content item toward the device. In one example, initiating the sending of the content item toward the device includes determining, by the processing system, the content item to be sent toward the device (e.g., such that the content item may be obtained and sent, an indication of the content item to be sent may be provided to the element which has access to the content item to trigger sending of the content item, and so forth). In one example, initiating the sending of the content item toward the device includes determining, by the processing system based on the first location of the device in the environment, the content item. In one example, initiating the sending of the content item toward the device includes determining, by the processing system, an indication of a target area of the environment and determining, by the processing system based on the first location of the device in the environment and the indication of the target area of the environment, the content item. In one example, the target area of the environment may include an overutilized area of the environment or an underutilized area of the environment. In one example, the target area of the environment may include an area of office space, a store, an area within a store, an area within a park, an area within a museum, or an area within a stadium. In one example, initiating the sending of the content item toward the device includes determining, by the processing system, user information associated with the user of the user device and determining, by the processing system based on the first location of the device in the environment and the user information associated with the user of the user device, the content item. It will be appreciated that the initiating of the content item toward the device may include various other functions (e.g., obtaining the content item and sending the content item toward the device, sending a message configured to trigger sending of the content item toward the device, and so forth).

At step 340, the processing system may receive a second set of location reports for the device. At step 350, the processing system may determine, based on the second set of location reports for the device, a second location of the device in the environment. In one example, the second set of location reports for the device includes a report including an indication of the second location of the device in the environment. In one example, the second set of location reports for the device includes a report including an identifier of one of the plurality of wireless beacons and distance information indicative of a distance between the device and the one of the plurality of wireless beacons. In one example, the second set of location reports for the device is received based on a Bluetooth-enabled application supported by the device.

At step 360, the processing system may provide, based on the first location of the device in the environment and the second location of the device in the environment, a metric indicative of an effectiveness of the content item in causing movement of a user of the device in the environment. For instance, the metric may be indicative of an effectiveness of the content item in causing movement of the user of the device (or multiple users) toward or away from a target area in the open space environment. The metric may be determined by evaluating various aspects of movement of the user(s), e.g., movement in a direction of the location to which the content item was configured to move the user(s) or whether the user(s) ultimately arrived in the location to which the content item was configured to move the user(s), etc. In examples where the metric specifically relates to multiple users, the metric may comprise a quantity or percentage of users that moved toward or away from the location to which the content item was configured to move the users (e.g., did at least a threshold number or percentage of users move toward or away from the location), and so forth.

At step 370, an optional step, the processing system may perform a management action. In one example, performing the management action may include initiating, by the processing system based on the metric indicative of the effectiveness of the content item in causing movement of the user of the device in the environment, a modification of the content item. In one example, performing the management action may include generating, by the processing system based on at least one of the first location of the device in the environment or the second location of the device in the environment, a location usage representation for the environment. In one example, the location usage representation for the environment may include a location usage heat map for the environment. In one example, performing the management action may further include augmenting, by the processing system, the location usage representation for the environment to include user action information associated with an action of the user in the environment. In one example, performing the management action may further include providing, by the processing system based on location usage representation for the environment, a recommendation related to a configuration of the environment. In one example, performing the management action may include generating, by the processing system based on at least one of the first location of the device in the environment or the second location of the device in the environment, location usage trend information for the environment. In one example, performing the management action further includes providing, by the processing system based on the location usage trend information for the environment, a recommendation related to a configuration of the environment.

Following step 360 or optional step 370, the method 300 proceeds to step 395 where the method 300 ends.

It should be noted that the method 300 may be expanded to include additional steps, or may be modified to replace steps with different steps, to combine steps, to omit steps, to perform steps in a different order, and so forth. For instance, in one example the processing system may repeat one or more steps of the method 300 to determine updated locations of user devices which may be used for various purposes (e.g., user-specific content delivery, updating location usage heat maps, and so forth). It will be appreciated that these and other modifications are all contemplated within the scope of the present disclosure.

It is noted that, although not expressly specified above, one or more steps of the method 300 may include a storing, displaying, and/or outputting steps as required for a particular application. In other words, any data, records, fields, and/or intermediate results discussed in the method can be stored, displayed, and/or outputted to another device as required for a particular application. Furthermore, operations, steps, or blocks in FIG. 3 that recite a determining operation or involve a decision do not necessarily require that both branches of the determining operation be practiced. In other words, one of the branches of the determining operation can be deemed as an optional step. Thus, the use of the term "optional step" is intended to only reflect different variations of a particular illustrative embodiment and is not intended to indicate that steps not labelled as optional steps to be deemed to be essential steps. Furthermore, operations, steps or blocks of the above described method(s) can be combined, separated, and/or performed in a different order from that described above, without departing from the example embodiments of the present disclosure.

It is noted that various example embodiments of the present disclosure may support various aspects of analysis and management of open space environments while obviating the need to use feedback surveys, clipboard observations, light sensors, facial recognition through video surveillance, access badge counting, and other mechanisms (although it will be appreciated that some or all such mechanisms may be used in conjunction with various example embodiments of the present disclosure to support various aspects of analysis and management of open space environments).

It should be noted that, as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may include a computing device including one or more processors or cores or multiple computing devices collectively configured to perform various steps, functions, and/or operations in accordance with the present disclosure.

Figure 4:
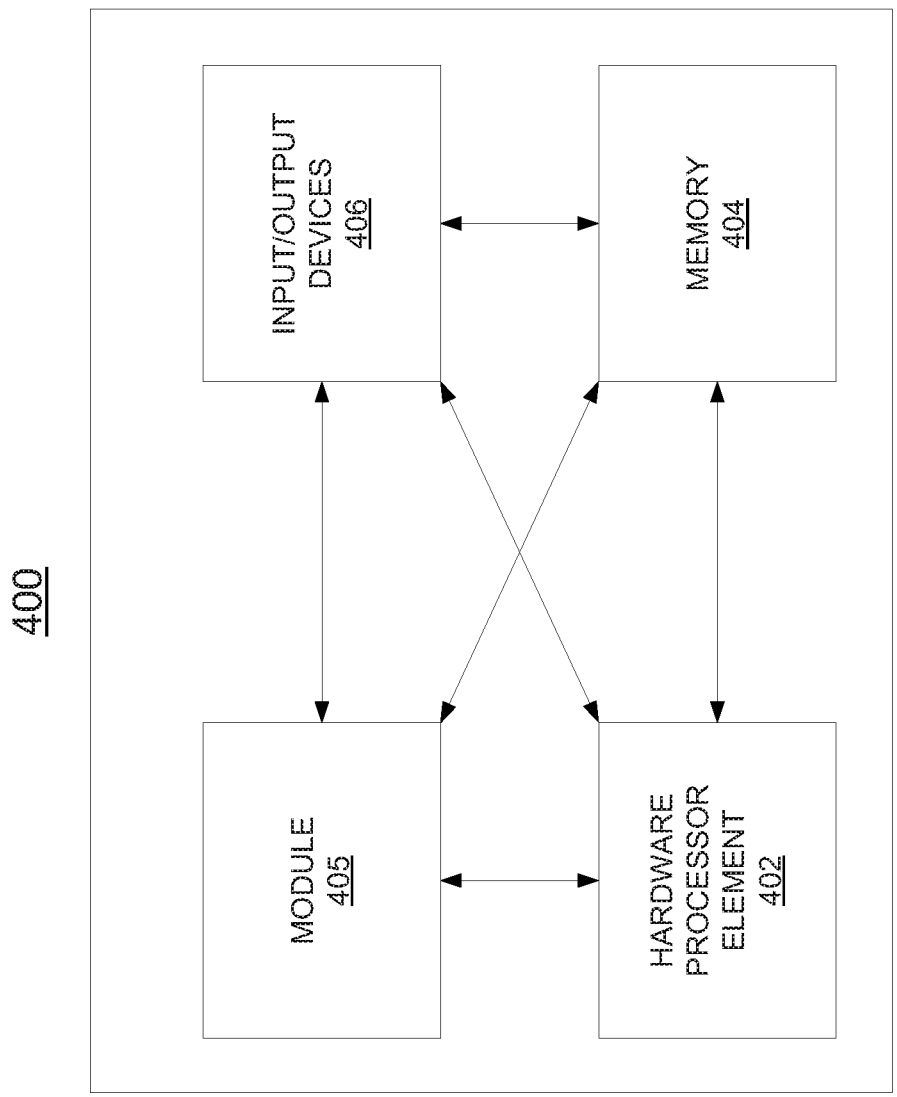
FIG. 4 illustrates a high level block diagram of a computing system specifically programmed to perform the steps, functions, blocks and/or operations described herein.

FIG. 4 depicts a high-level block diagram of a computing system specifically programmed to perform the functions described herein. For example, any one or more components or devices illustrated in FIG. 1 or FIG. 2 or described in connection with the method 300 may be implemented as the computing system 400. As depicted in FIG. 4, the computing system 400 includes one or more hardware processor elements 402 (e.g., a microprocessor, a central processing unit (CPU) and the like), a memory 404, (e.g., random access memory (RAM), read only memory (ROM), a disk drive, an optical drive, a magnetic drive, and/or a Universal Serial Bus (USB) drive), a module 405 for asset location tracking in an open space environment, and one or more input/output devices 406, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one processor element is shown, it should be noted that the computing device may employ a plurality of processor elements. Furthermore, although only one computing device is shown in the FIG. 4, if the method(s) as discussed above is implemented in a distributed or parallel manner for a particular illustrative example, i.e., the steps of the above method(s) or the entire method(s) are implemented across multiple or parallel computing devices, e.g., a processing system, then the computing device of FIG. 4 is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor element 402 can also be configured or programmed to cause other devices to perform one or more operations as discussed above. In other words, the hardware processor element 402 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the module 405 for asset location tracking in an open space environment (e.g., a software program including computer-executable instructions) can be loaded into memory 404 and executed by hardware processor element 402 to implement the steps, functions or operations as discussed above in connection with the example method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the module 405 for asset location tracking in an open space environment (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium includes a physical device, a hardware device, or a device that is discernible by the touch. More specifically, the computer-readable storage device may include any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method, comprising:
receiving, by a processing system including at least one processor, a first set of location reports from a plurality of devices that is located in an environment including a plurality of wireless beacons, wherein the plurality of wireless beacons is separate from the plurality of devices, and wherein the plurality of devices generates the first set of location reports based on a first set of wireless signals transmitted from the plurality of wireless beacons to the plurality of devices;
determining, by the processing system based on the first set of location reports for the plurality of devices, respective first locations of the plurality of devices in the environment;
generating, by the processing system based on the respective first locations of the plurality of devices in the environment, a location usage map configured to indicate numbers of respective users of the plurality of devices who are present at respective points within the environment, and wherein the location usage map is based on a layout of the environment;
identifying, by the processing system based on the location usage map, an area of the environment that is over-utilized;
initiating, by the processing system based on the identifying, a sending of a content item toward the plurality of devices, wherein the content item is designed to cause desired movements of the respective users of the plurality of devices away from the area of the environment that is over-utilized;
receiving, by the processing system, a second set of location reports from the plurality of devices, wherein the plurality of devices generates the second set of location reports based on a second set of wireless signals transmitted from the plurality of wireless beacons to the plurality of devices;
determining, by the processing system based on the second set of location reports for the plurality of devices, respective second locations of the plurality of devices in the environment; and
providing, by the processing system based on the respective first locations of the plurality of devices in the environment and the respective second locations of the plurality of devices in the environment, a metric indicative of an effectiveness of the content item in causing the desired movements of the respective users away from the area of the environment that is over-utilized, wherein the metric comprises a percentage or a quantity of the respective users who moved according to the desired movements.

2. The method of claim 1, wherein the first set of location reports from the plurality of devices includes a report comprising an indication of the respective first locations of the plurality of devices in the environment.

3. The method of claim 1, wherein the first set of location reports from the plurality of devices includes a report comprising an identifier of one of the plurality of wireless beacons and distance information indicative of a distance between a first device of the plurality of devices and the one of the plurality of wireless beacons.

4. The method claim 1, wherein the first set of location reports from the plurality of devices and the second set of location reports from the plurality of devices are received based on a Bluetooth-enabled application supported by the plurality of devices.

5. The method of claim 1, wherein the initiating the sending of the content item toward the plurality of devices comprises:
determining, by the processing system based on the respective first locations of the plurality of devices in the environment, the content item.

6. The method of claim 1, wherein the initiating the sending of the content item toward the plurality of devices comprises:
determining, by the processing system, an indication of the area of the environment that is over-utilized; and
determining, by the processing system based on the respective first locations of the plurality of devices in the environment and the indication of the area of the environment that is over-utilized, the content item.

7. The method of claim 1, wherein the initiating the sending of the content item toward the plurality of devices comprises:
determining, by the processing system, user information associated with the respective users of the plurality of devices; and
determining, by the processing system based on the respective first locations of the plurality of devices in the environment and the user information associated with the respective users of the plurality of devices, the content item.

8. The method of claim 1, further comprising:
performing, by the processing system, a management action.

9. The method of claim 8, wherein the performing the management action comprises:
initiating, by the processing system based on the metric indicative of the effectiveness of the content item in causing the desired movements of the respective users in relation to the area of the environment that is over-utilized, a modification of the content item.

10. The method of claim 8, wherein the performing the management action further comprises:
augmenting, by the processing system, the location usage map for the environment to include user action information associated with an action of a user of the respective users in the environment.

11. The method of claim 10, wherein the action of the user comprises at least one selected from a group of: a movements of the user in the environment, a purchase made by the user in the environment, and a use of resources of the environment by the user.

12. The method of claim 8, wherein the performing the management action further comprises:
providing, by the processing system based on the location usage map for the environment, a recommendation related to a configuration of the environment.

13. The method of claim 8, wherein the performing the management action comprises:
generating, by the processing system based on at least one of the respective first locations of the plurality of devices in the environment or the respective second locations of the plurality of devices in the environment, location usage trend information for the environment.

14. The method of claim 13, wherein the performing the management action further comprises:
providing, by the processing system based on the location usage trend information for the environment, a recommendation related to a configuration of the environment.

15. The method of claim 1, wherein the location usage map for the environment comprises a location usage heat map for the environment in which various colors are used to indicate the numbers of the respective users who are present at the respective points within the environment, and wherein different colors of the various colors are representative of different levels of usage in the respective points within the environment.

16. The method of claim 1, wherein the environment comprises an open space environment.

17. The method of claim 16, wherein the open space environment comprises at least one of an indoor location having an open floorplan or an outdoor location.

18. The method of claim 1, wherein the content item is further designed to cause the desired movements of the respective users of the plurality of devices toward an area of the environment that is under-utilized.

19. An apparatus, comprising:
a processing system including at least one processor; and
a computer-readable medium storing instructions which, when executed by the processing system, cause the processing system to perform operations, the operations comprising:
receiving a first set of location reports from a plurality of devices that is located in an environment including a plurality of wireless beacons, wherein the plurality of wireless beacons is separate from the plurality of devices, and wherein the plurality of devices generates the first set of location reports based on a first set of wireless signals transmitted from the plurality of wireless beacons to the plurality of devices;
determining, based on the first set of location reports for the plurality of devices, respective first locations of the plurality of devices in the environment;
generating, based on the respective first locations of the plurality of devices in the environment, a location usage map configured to indicate numbers of respective users of the plurality of devices who are present at respective points within the environment, and wherein the location usage map is based on a layout of the environment;
identifying, based on the location usage map, an area of the environment that is over-utilized;
initiating, based on the identifying, a sending of a content item toward the plurality of devices, wherein the content item is designed to cause desired movements of the respective users of the plurality of devices away from the area of the environment that is over-utilized;
receiving a second set of location reports from the plurality of devices, wherein the plurality of devices generates the second set of location reports based on a second set of wireless signals transmitted from the plurality of wireless beacons to the plurality of devices;
determining, based on the second set of location reports for the plurality of devices, respective second locations of the plurality of devices in the environment; and
providing, based on the respective first locations of the plurality of devices in the environment and the respective second locations of the plurality of devices in the environment, a metric indicative of an effectiveness of the content item in causing the desired movements of the respective users away from the area of the environment that is over-utilized, wherein the metric comprises a percentage or a quantity of the respective users who moved according to the desired movements.

20. A non-transitory computer-readable medium storing instructions which, when executed by a processing system including at least one processor, cause the processing system to perform operations, the operations comprising:

receiving a first set of location reports from a plurality of devices that is located in an environment including a plurality of wireless beacons, wherein the plurality of wireless beacons is separate from the plurality of devices, and wherein the plurality of devices generates the first set of location reports based on a first set of wireless signals transmitted from the plurality of wireless beacons to the plurality of devices;

determining, based on the first set of location reports for the plurality of devices, respective first locations of the plurality of devices in the environment;

generating, based on the respective first locations of the plurality of devices in the environment, a location usage map configured to indicate numbers of respective users of the plurality of devices who are present at respective points within the environment, and wherein the location usage map is based on a layout of the environment;

identifying, based on the location usage map, an area of the environment that is over-utilized;

initiating, based on the identifying, a sending of a content item toward the plurality of devices, wherein the content item is designed to cause desired movements of the respective users of the plurality of devices away from the area of the environment that is over-utilized;

receiving a second set of location reports from the plurality of devices, wherein the plurality of devices generates the second set of location reports based on a second set of wireless signals transmitted from the plurality of wireless beacons to the plurality of devices;

determining, based on the second set of location reports for the plurality of devices, respective second locations of the plurality of devices in the environment; and providing, based on the respective first locations of the plurality of devices in the environment and the respective second locations of the plurality of devices in the environment, a metric indicative of an effectiveness of the content item in causing the desired movements of the respective users away from the area of the environment that is over-utilized, wherein the metric comprises a percentage or a quantity of the respective users who moved according to the desired movements.

* * * * *